(12) United States Patent
Wu et al.

(10) Patent No.: US 12,393,958 B2
(45) Date of Patent: Aug. 19, 2025

(54) COMPUTERIZED SYSTEMS AND METHODS FOR PREDICTING AND MANAGING SCRAP

(71) Applicant: COUPANG CORP., Seoul (KR)

(72) Inventors: Zonghan Wu, Shanghai (CN); Timothy Schoenharl, Shanghai (CN); Wei Wei, Shanghai (CN); Sheng Meng, Shanghai (CN); Ping Yin, Shanghai (CN)

(73) Assignee: COUPANG CORP., Seoul (KR)

( * ) Notice: Subject to any disclaimer, the term of this patent is extended or adjusted under 35 U.S.C. 154(b) by 546 days.

(21) Appl. No.: 17/546,250

(22) Filed: Dec. 9, 2021

(65) Prior Publication Data

US 2022/0188846 A1 Jun. 16, 2022

Related U.S. Application Data

(60) Provisional application No. 63/123,642, filed on Dec. 10, 2020.

(51) Int. Cl.
*G06Q 30/02* (2023.01)
*G06N 3/02* (2006.01)
(Continued)

(52) U.S. Cl.
CPC ........... *G06Q 30/0202* (2013.01); *G06N 3/02* (2013.01); *G06Q 30/0201* (2013.01)

(58) Field of Classification Search
None
See application file for complete search history.

(56) References Cited

U.S. PATENT DOCUMENTS 8,190,461 B2 5/2012 Hartel et al.
10,878,394 B1 * 12/2020 Gjertson ................ G06Q 20/20
(Continued)

FOREIGN PATENT DOCUMENTS

| JP | 2019-144950 | 8/2019 |
|---|---|---|
| JP | 2020-190490 | 11/2020 |
| KR | 10-2020-0137085 | 12/2020 |

OTHER PUBLICATIONS

International Search Report and Written Opinion of the International Search Authority in International Application No. PCT/IB2021/061526 dated Mar. 14, 2022 (8 pages).
(Continued)

*Primary Examiner* — Alan Torrico-Lopez
(74) *Attorney, Agent, or Firm* — FINNEGAN, HENDERSON, FARABOW, GARRETT & DUNNER LLP

(57) ABSTRACT

Systems and methods for predicting that a stock keeping unit (SKU) is likely to be scrapped and performing preventative actions accordingly. The system receives a request to initiate a process related to predicting scrap likelihood associated with a plurality of SKUs, inputs data associated with each SKU into a trained prediction model, outputs, from the trained prediction model, a prediction value for each SKU, measures the trained prediction model by calculating a set of values, and generates a matrix comprising the calculated set of values. Using the matrix, a threshold prediction value is determined, and each SKU prediction value is compared to the threshold prediction value. Based on the comparison, a SKU of the plurality of SKUs is predicted as likely to be scrapped and at least one of a plurality of preventative actions is performed.

18 Claims, 12 Drawing Sheets

(51) Int. Cl.
*G06Q 30/0201* (2023.01)
*G06Q 30/0202* (2023.01)

(56) References Cited

U.S. PATENT DOCUMENTS

| | | | |
|---|---|---|---|
| 11,645,613 B1 * | 5/2023 | Capers | G06Q 30/0641 705/21 |
| 2016/0027026 A1 | 1/2016 | Matsui et al. | |
| 2017/0169463 A1 | 6/2017 | Couvillon et al. | |
| 2019/0272557 A1 * | 9/2019 | Smith | G06Q 10/087 |
| 2021/0192436 A1 * | 6/2021 | Tiwari | G06Q 50/22 |

OTHER PUBLICATIONS

Notice of Preliminary Rejection in counterpart Korean Patent Application No. 10-2022-7026163 dated Aug. 28, 2023 (17 pages).

* cited by examiner

Favorites Application                                              login  Sign Up  Service center <div style="text-align:center">all</div>

My Account  Shopping Cart

Shipments  Fast Shipments  Christmas  Gold deals  Regular delivery  Events / Coupons  Planned Exhibition
Gift Cards Home > Food > Daily products / ice cream > Cheese > Fresh cheese > Mozzarella mozzarella cheese

285 Reviews   20,000 won

FREE Shipping
Tomorrow (Wed) 11/28 Arrival Guarantee

Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
|---|---|---|---|---|---|
| 6,500 won | 3,800 won | 6,460 won | 4,870 won | 2,370 won | 2,340 won |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

| Product Details | Reviews (285) | Contact Us | Shipping & Returns |

Required notation information

| Type of food | Natural cheese / frozen products | Producers and Locations | Cheese Corp. / Republic of Korea |
|---|---|---|---|
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and | Content reference | nutrient | None |

| Threshold | Scrap Reduced Percentage | | | | | | recall | precision |
|---|---|---|---|---|---|---|---|---|
| | 20% | 30% | 40% | 50% | 60% | 70% | | |
| 0 | -19.9% | -10.1% | -0.229% | 9.61% | 19.4% | 29.3% | 1.00 | 0.05 |
| 0.1 | -53.0% | -45.5% | -38.0% | -30.6% | -23.1% | -15.6% | 0.65 | 0.66 |
| 0.2 | -53.1% | -45.8% | -38.4% | -31.1% | -23.8% | -16.4% | 0.63 | 0.68 |
| 0.3 | -52.9% | -45.8% | -38.6% | -31.4% | -24.3% | -17.1% | 0.62 | 0.70 |
| 0.4 | -52.6% | -45.6% | -38.6% | -31.5% | -24.5% | -17.5% | 0.60 | 0.71 |
| 0.5 | -52.5% | -45.5% | -38.6% | -31.7% | -24.8% | -17.9% | 0.59 | 0.73 |
| 0.6 | -51.7% | -44.9% | -38.2% | -31.4% | -24.6% | -17.9% | 0.57 | 0.74 |
| 0.7 | -51.3% | -44.7% | -38.0% | -31.3% | -24.7% | -18.0% | 0.56 | 0.74 |
| 0.8 | -50.9% | -44.3% | -37.7% | -31.2% | -24.6% | -18.0% | 0.55 | 0.75 |
| 0.9 | -49.9% | -43.6% | -37.2% | -30.8% | -24.4% | -18.0% | 0.51 | 0.77 |
| 1 | -42.8% | -37.5% | -32.1% | -26.7% | -21.4% | -16.0% | 0.42 | 0.81 |

FIG. 6 ately predict scrap, they are not suitable because the number of factors influencing scrap is very large making it too complicated to build clear rules for judging the risk of scrap. Predicting scrap requires being able to collect as many related factors as possible without having to worry about noise brought by non-relative factors.

COMPUTERIZED SYSTEMS AND METHODS FOR PREDICTING AND MANAGING SCRAP

CROSS REFERENCE TO RELATED APPLICATIONS

This application claims the benefit of priority of U.S. Provisional Application No. 63/123,642 filed Dec. 10, 2020. The disclosure of the above-referenced application is expressly incorporated herein by reference in its entirety.

TECHNICAL FIELD

The present disclosure generally relates to computerized systems and methods for predicting and preventing scrap. In particular, embodiments of the present disclosure relate to inventive and unconventional systems for determining whether one or more items with a particular stock keeping unit (SKU) are likely to be scrapped in the near future by using a trained neural network to calculate a prediction value, and preventing the items from being scrapped by performing a preventative action when the items are determined likely to be scrapped based on a determined threshold.

BACKGROUND

Fresh food inventory management presents many challenges in almost all e-commerce companies. When placing purchase orders (PO) there is a target demand period starting from the expected delivery day to the demand period end day. After the demand period, when inventory exceeds its sellable life, it must be discarded. The inventory that must be discarded, also known as scrap, presents a key challenge to making fresh food retailing profitable. Although order quantities can be limited to a lower level in order to avoid scrap, doing so brings out of stock issues and will cause gross merchandise value (GMV) loss. Therefore, handling scrap is not simply an issue that can be fixed by lowering in-stock rates.

To mitigate such problems, conventional electronic prediction systems implement expert systems based on manually designed rules or use decision tree models. For example, expert systems may be built by creating a database of rules to determine whether an item is expected to be scrapped in the near future. While these systems attempt to accur Therefore, there is a need for improved methods and systems for predicting that an item will be scrapped by implementing a prediction model capable of accepting various kinds of factors as input.

SUMMARY

One aspect of the present disclosure is directed to a system comprising one or more memory devices storing instructions and one or more processors configured to execute the instructions to perform a method for determining scrap likelihood of stock keeping units. The method includes receiving a request to initiate a process related to predicting scrap likelihood associated with a plurality of stock keeping units (SKUs), in response to receiving the request, preparing input data associated with each SKU of the plurality of SKUs, and preparing information related to the request by inputting the input data associated with each SKU of the plurality of SKUs into a trained prediction model, outputting, from the trained prediction model, a prediction value for each SKU of the plurality of SKUs, measuring the trained prediction model by calculating a set of values, and generating a matrix comprising at least a subset of the calculated set of values. The method further includes selecting a first value of the calculated set of values corresponding to a threshold prediction value of a plurality of threshold values, comparing, for each SKU of the plurality of SKUs, the prediction value output from the trained prediction model to the threshold prediction value, determining, based on the comparison, a scrap likelihood for each SKU of the plurality of SKUs, and, based on the scrap likelihood indicating likely to be scrapped, performing at least one of a plurality of preventative actions.

Another aspect of the present disclosure is directed to a method for determining scrap likelihood of stock keeping units. The method includes receiving a request to initiate a process related to predicting scrap likelihood associated with a plurality of stock keeping units (SKUs), in response to receiving the request, preparing input data associated with each SKU of the plurality of SKUs, and preparing information related to the request by inputting the input data associated with each SKU of the plurality of SKUs into a trained prediction model, outputting, from the trained prediction model, a prediction value for each SKU of the plurality of SKUs, measuring the trained prediction model by calculating a set of values, and generating a matrix comprising at least a subset of the calculated set of values. The method further includes selecting a first value of the calculated set of values corresponding to a threshold prediction value of a plurality of threshold values, comparing, for each SKU of the plurality of SKUs, the prediction value output from the trained prediction model to the threshold prediction value, determining, based on the comparison, a scrap likelihood for each SKU of the plurality of SKUs, and, based on the scrap likelihood indicating likely to be scrapped, performing at least one of a plurality of preventative actions.

Yet another aspect of the present disclosure is directed to a system comprising one or more memory devices storing instructions and one or more processors configured to execute the instructions to perform a method for determining scrap likelihood of stock keeping units. The method includes receiving a request to initiate a process related to predicting scrap likelihood associated with a plurality of stock keeping units (SKUs), in response to receiving the request, preparing input data associated with each SKU of the plurality of SKUs, and preparing information related to the request by inputting the input data associated with each SKU of the plurality of SKUs into a trained neural network, outputting, from the trained neural network, a prediction value for each SKU of the plurality of SKUs, measuring the trained neural network by calculating a set of values, and generating a matrix comprising at least a subset of the calculated set of values. The method further includes selecting a first value of the calculated set of values corresponding to a threshold prediction value of a plurality of threshold values, comparing, for each SKU of the plurality of SKUs, the prediction value output from the trained neural network to the threshold prediction value, determining, based on the comparison, a scrap likelihood for each SKU of the plurality of SKUs, and, based on the scrap likelihood indicating likely to be scrapped, performing at least one of a plurality of preventative actions.

Other systems, methods, and computer-readable media are also discussed herein.

BRIEF DESCRIPTION OF THE DRAWINGS

FIG. 1C depicts a sample Single Detail Page (SDP) that includes a product and information about the product along with interactive user interface elements, consistent with the disclosed embodiments.

FIG. 6 shows a table illustrating an exemplary generated matrix, consistent with the disclosed embodiments.

DETAILED DESCRIPTION

Figure 1A:
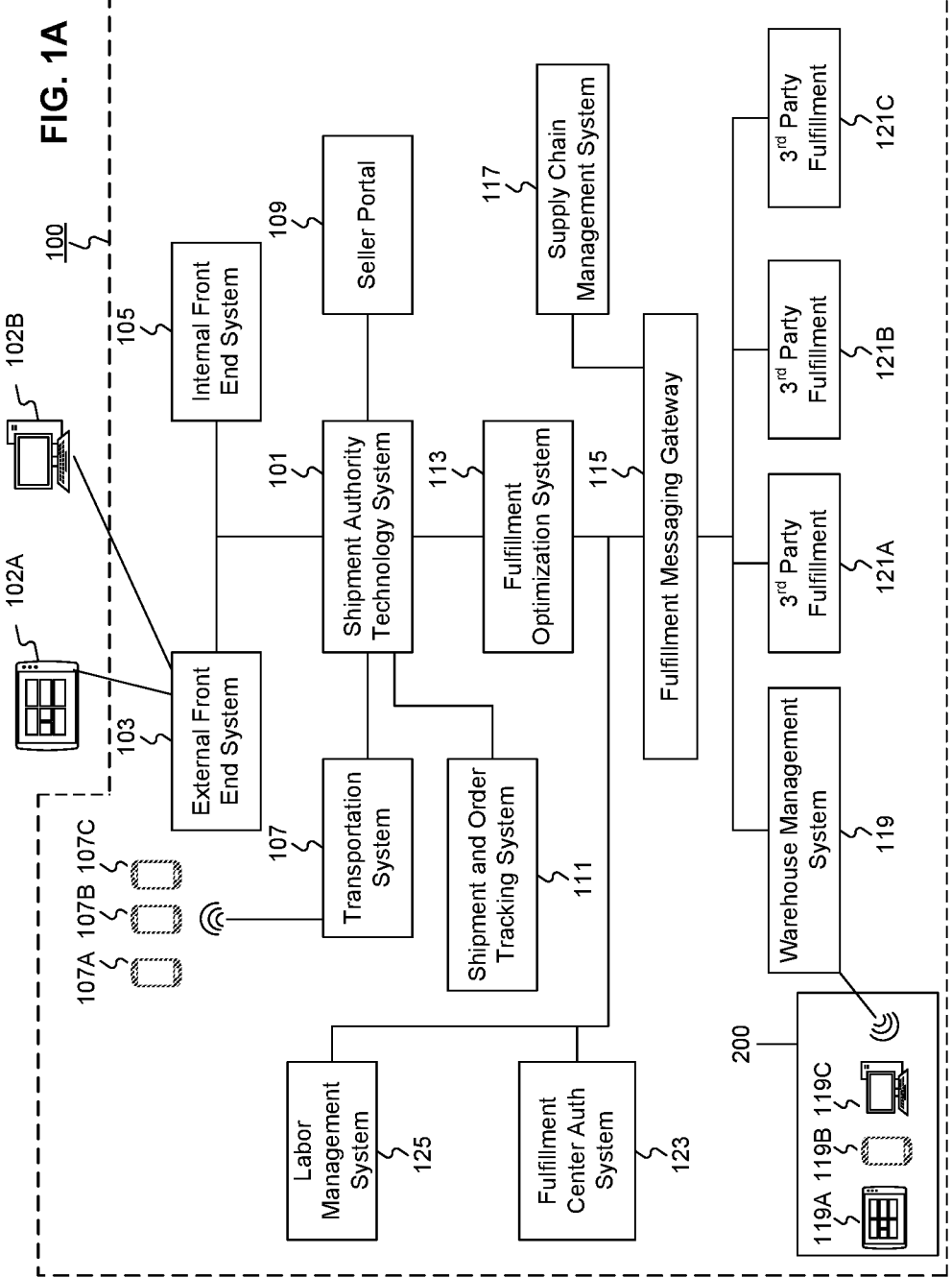
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for determining whether one or more items with a particular SKU (stock keeping unit) are likely to be scrapped in the near future by running data through a trained neural network, measuring the trained neural network by calculating a set of values to determine a threshold prediction value, and comparing data output by the trained neural network to the threshold prediction value to determine whether the items are likely to be scrapped. Based on a determination that items with the stock keeping unit are likely to be scrapped, preventative actions may be performed. The disclosed embodiments provide innovative technical features that allow proactive management by predicting that an item will be scrapped, wherein the prediction is attained by running a trained neural network and measuring the performance of the neural network by calculating a set of values. For example, the disclosed embodiments enable inputting a plurality of scaled factors into a trained neural network to output prediction values for a plurality of SKUs, enable measurement of the trained neural network by calculating a set of values, enable determination of a threshold prediction value for comparison to the prediction values output by the trained neural network, enable determination of a SKU as likely or unlikely to be scrapped, and enable performance of a preventative action when a SKU is determined as likely to be scrapped.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
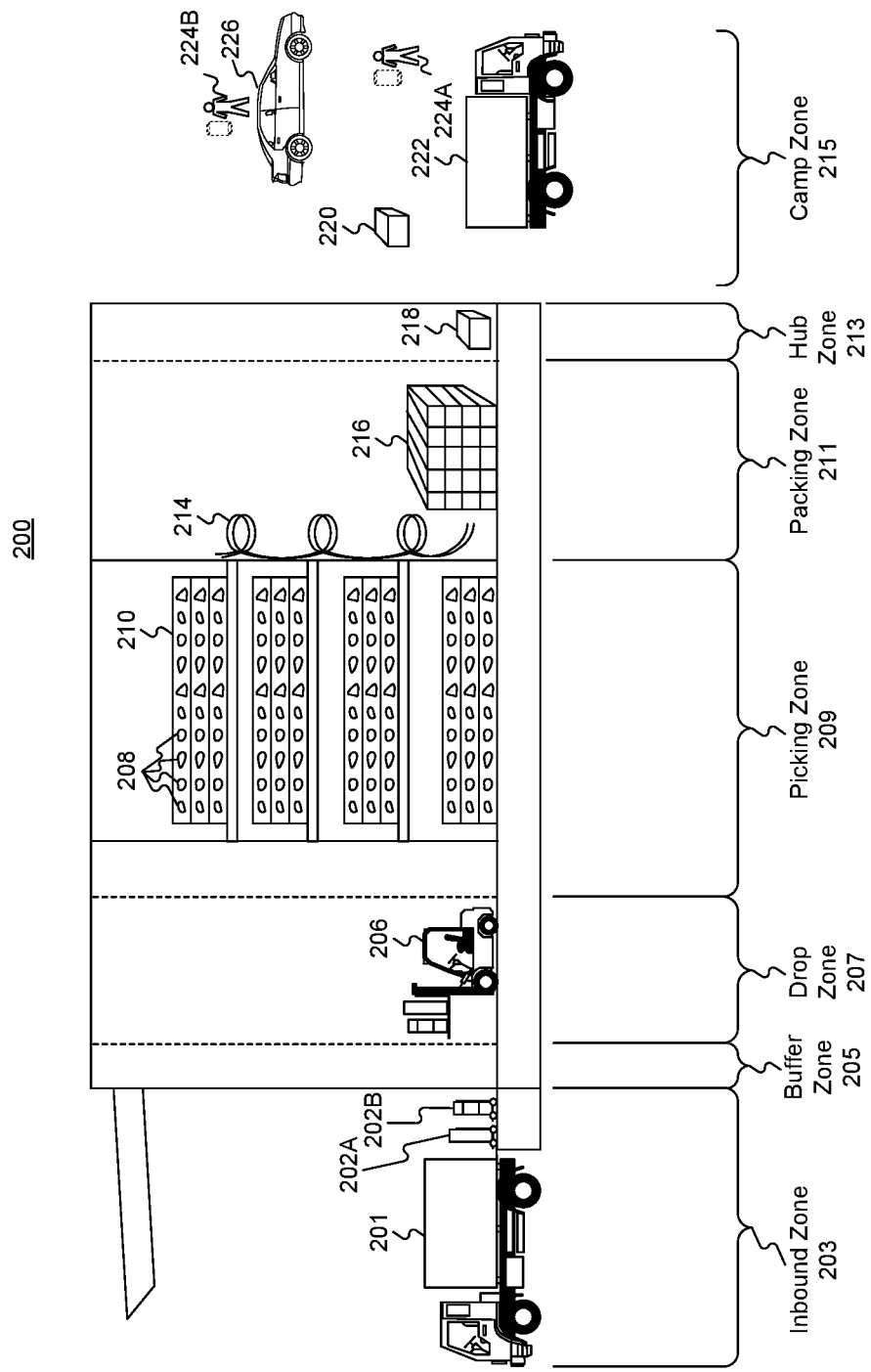
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1198.

Once a user places an order, a picker may receive an instruction on device 1198 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

According to an aspect of the present disclosure, a computer-implemented system for predicting a scrap likelihood of a stock keeping unit (SKU) may comprise one or more memory devices storing instructions, and one or more processors configured to execute the instructions to perform operations. The scrap likelihood of one or more items with a particular SKU may be predicted by running data through a deep neural network and measuring the deep neural network to determine a threshold value for data output by the deep neural network. In some embodiments, the disclosed functionality and systems may be implemented as part of SCM system 117. The preferred embodiment comprises implementing the disclosed functionality and systems on SCM system 117, but one of ordinary skill will understand that other implementations are possible.

Scrap likelihood, which indicates a likelihood that items with a particular stock keeping unit (SKU) will be scrapped within a time period (e.g., 2 to 4 days, 48 to 96 hours, or the like) can be determined by considering one or more factors associated with stock keeping units. For example, factors may include, but are not limited to, inventory, sales trend, forecast, out of stock (OOS) hours, code life sellable days, average sales, minimal order quantity (MOQ), shelf life, degree (i.e., temperature), status, lead time, expiration date, exceptional hours, sales delayed, and recent scrap. Below is a table of exemplary factors.

| Index | Name | Definition |
| --- | --- | --- |
| 1 | shelflife | how many days the SKU product(s) will be sellable for |
| 2 | shelflife_3 | shelflife < 3 days |
| 3 | shelflife_7 | shelflife < 7 days |
| 4 | shelflife_14 | shelflife < 14 days |
| 5 | shelflife_28 | shelflife < 28 days |
| 6 | shelflife_181 | shelflife < 181 days |
| 7 | degree_chilled | whether the SKU product(s) should be chilled |
| 8 | degree_frozen | whether the SKU product(s) should be frozen |
| 9 | degree_ambient | whether the SKU product(s) should be stored at ambient temperature |
| 10 | new_sku | whether the SKU is new (i.e., first seen in the system within the last 6 months) |
| 11 | obselete_sku | 'OBSOLETE' in postatus; representing whether the SKU is obsolete (i.e., no longer used for the product in question) |
| 12 | inactive_sku | 'INACTIVE_SEASON_OFF' in postatus; representing whether the SKU is inactive (e.g., a winter jacket during the summer) |
| 13 | manual_sku | 'MANUAL' in postatus; manually input purchase order status for the SKU when it doesn't fall into one of the above statuses |
| 14 | leadtime | the number of days between order and delivery |
| 15 | leadtime_2 | leadtime < 2 days |
| 16 | leadtime_3 | leadtime < 3 days |
| 17 | leadtime_4 | leadtime < 4 days |
| 18 | leadtime_10 | leadtime < 10 days |
| 19 | leadtime_30 | leadtime < 30 days |
| 20 | leadtime_90 | leadtime < 90 days |
| 21 | expirationdate | expire_date_managed = 'Y' (i.e., expiration date of the SKU) |
| 22 | dp | demand period days (i.e., a value representing the target sales period for the SKU) |
| 23 | dp_2 | dp < 2 days |
| 24 | dp_3 | dp < 3 days |
| 25 | dp_4 | dp < 4 days |
| 26 | dp_7 | dp < 7 days |
| 27 | dp_14 | dp < 14 days |
| 28 | moq | minimal order quantity (e.g., the fewest number of units to be purchased at one time) |
| 29 | sellable_days | the number of sellable days indicating whether the SKU has a short code life (i.e., high order frequency) or a long code life (low order frequency)) |
| 30 | sellable_days_3 | sellable_days < 3 days |
| 31 | sellable_days_4 | sellable_days < 4 days |

-continued

| Index | Name | Definition |
|---|---|---|
| 32 | sellable_days_5 | sellable_days < 5 days |
| 33 | sellable_days_7 | sellable_days < 7 days |
| 34 | sellable_days_14 | sellable_days < 14 days |
| 35 | sellable_days_28 | sellable_days < 28 days |
| 36 | sellable_days_181 | sellable_days < 181 days |
| 37 | exp_sales_dp | sum of daily expected sales among the demand period days |
| 38 | inv | inventory volume on order day |
| 39 | avg_adj_sales | average adjusted sales in recent 7 days |
| 40 | avg_sales | average actual sales in recent 7 days |
| 41 | andon_sku | yesterday andon (i.e., number of hours the SKU was in an unsellable state yesterday) |
| 42 | AVG_D3_D | average sales of D-3 (3 days before D day) to D day |
| 43 | MAX_D3_D | max sales of D-3 (3 days before D day) to D day |
| 44 | MAX_D7_D3 | max sales of D-7 (7 days before D day) to D3 (3 days before D day) |
| 45 | AVG_D7_D3 | average sales of D-7 (7 days before D day) to D-3 (3 days before D day) |
| 46 | over_promo_times | number of actual sales > after promotion forecast |
| 47 | overforecast_2_times | number of actual sales > exp_sales_dp (index 37) * 2 |
| 48 | over_order_12_times | purchase order quantity > exp_sales_dp (index 37) * 1.2 |
| 49 | long_sl_overforecast_2_times | for shelflife > 14 days |
| 50 | long_sl_over_order_12_times | for shelflife > 14 days |
| 51 | one_day_oos_hours | the number of hours the SKU was out of stock (oos) yesterday |
| 52 | one_day_andon_hours | the number of hours the SKU was unsellable (andon) yesterday |
| 53 | one_day_exclude_sales_hours | the number of hours the SKU was excluded from sales yesterday |
| 54 | one_day_discount_hours | the number of hours the SKU was discounted yesterday |
| 55 | two_days_oos_hours | the number of hours the SKU was out of stock in the last two days |
| 56 | two_days_andon_hours | the number of hours the SKU was unsellable (andon) in the last two days |
| 57 | two_days_exclude_sales_hours | the number of hours the SKU was excluded from sales in the last two days |
| 58 | two_days_discount_hours | the number of hours the SKU was discounted in the last two days |
| 59 | sales_delayed_avg | average of days sales_dt after demand period ends |
| 60 | sales_delayed_avg_sellable | sales_delayed_avg > sellable_days |
| 61 | sales_delayed_avg_sellable_v2 | sellable_days − sales_delayed_avg |
| 62 | sales_delayed_dts | count of days sales_dt after demand period ends |
| 63 | near_scrap_times | number of sales_after_edd_days + 1 >= sellable_days (edd = estimated date of delivery) |
| 64 | yesterday_sales_after_edd_days | sales_after_edd_days for yesterday (edd = estimated date of delivery) |
| 65 | stow_delay | actual stow finish time is later than the expected stow finish time at a fulfillment center |
| 66 | receive_delay | actual receive time is later than the expected receive time at a fulfillment center |
| 67 | target_scrap_inv | sum of target_scrap_inventory in scope days |
| 68 | sales_1d | yesterday's actual sales |
| 69 | adj_sales_1d | yesterday's adjusted sales |
| 70 | sales_2d | actual sales in the last two days |
| 71 | adj_sales_2d | adjusted sales in the last two days |
| 72 | sales_3d | actual sales in the last three days |
| 73 | adj_sales_3d | adjusted sales in the last three days |
| 74 | po_diff_roq | average of recent ([purchase_order] − [recommended_order_quantity])/avg_sales |
| 75 | roq_diff_fcst | average of recent ([recommended_order_quantity] − [forecast])/avg_sales |
| 76 | actual_po | average of recent actual purchase_order/avg sales |
| 77 | xdock_roq_diff_fcst | recommended order quantity different from forecast for cross docking cases |
| 78 | xdock_fc_order_qty | fulfillment center order quantity for cross docking cases |

| Index | Name | Definition |
|---|---|---|
| 79 | safetystock | safety_stock/100 (safety stock = extra inventory needed to reduce out of stock) |
| 80 | over_fct_times | for promotion days, forecast > actual sales |
| 81 | promo_times | number of promotion times in recent 10 days |
| 82 | overforecast_1_times | number of times that forecast > expected_sales_demand_period |
| 83 | overforecast_1_2_times | number of times that forecast > expected_sales_demand_period * 1.2 |
| 84 | over_order_times | number of times that purchase_order_quantity > expected_sales_demand_period |
| 85 | total_scrap_units_recent_1d | sum of yesterday's scrap units |
| 86 | total_scrap_units_recent_3d | sum of scrap units in last 3 days |
| 87 | actual_po | duplicated with #76 to construct a convolutional neural network |
| 88 | inv_exp_sales_dp | inventory − exp_sales_dp |
| 89 | moq_sales_sellable | moq > avg_sales * sellable_days |
| 90 | small_inv | inventory < adj_avg_sales |
| 91 | sales_drop | AVG_D7_D3 > AVG_D3_D * 1.5 && MAX_D7_D3 > MAX_D3_D * 1.5 |
| 92 | sales_increase | AVG_D3_D > AVG_D7_D3 * 1.5 && MAX_D3_D > MAX_D7_D3 * 1.5 |
| 93 | large_moq | moq > avg_adjusted_sales * sellable_days |

Such factors can be input into a trained neural network, which outputs prediction values that, based on a threshold value, indicate a scrap likelihood associated with a SKU. Depending on the threshold value, there are more or less SKUs predicted as likely to be scrapped, which can affect gross merchandise value (GMV) loss. In order to minimize GMV loss while also maximizing reduced scrap, a threshold value that balances the two variables may be determined by generating a matrix comprising calculated values, such as recall and precision. Once the threshold value is determined, the scrap likelihood associated with a SKU for a plurality of SKUs can be determined and, if items with a particular SKU are determined as likely to be scrapped, an action to prevent the items from being scrapped can be performed.

Figure 3A:
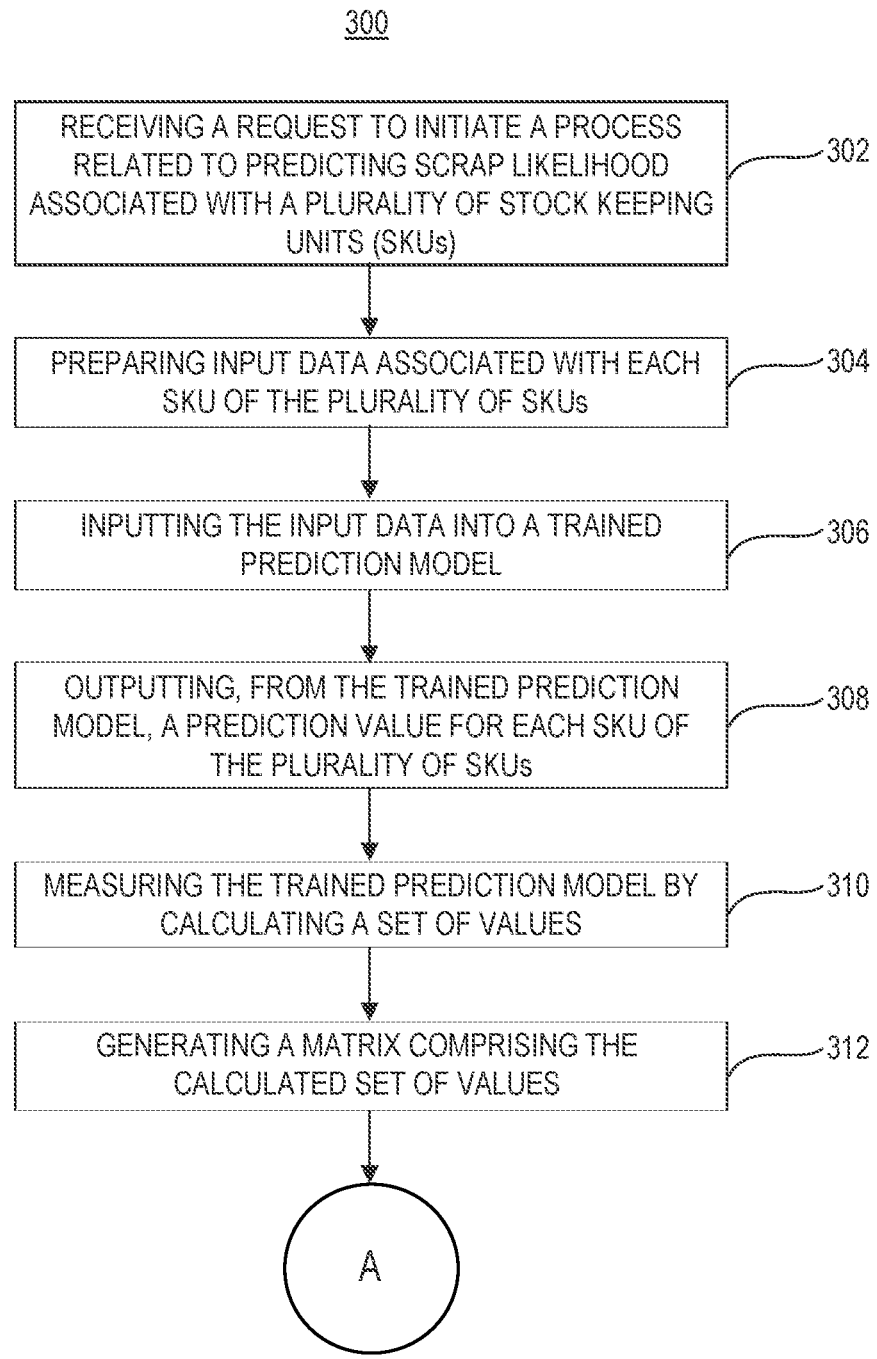
FIGS. 3A and 3B show an exemplary method for predicting scrap likelihood of stock keeping units and prevention of scrap, consistent with the disclosed embodiments.
Figure 3B:
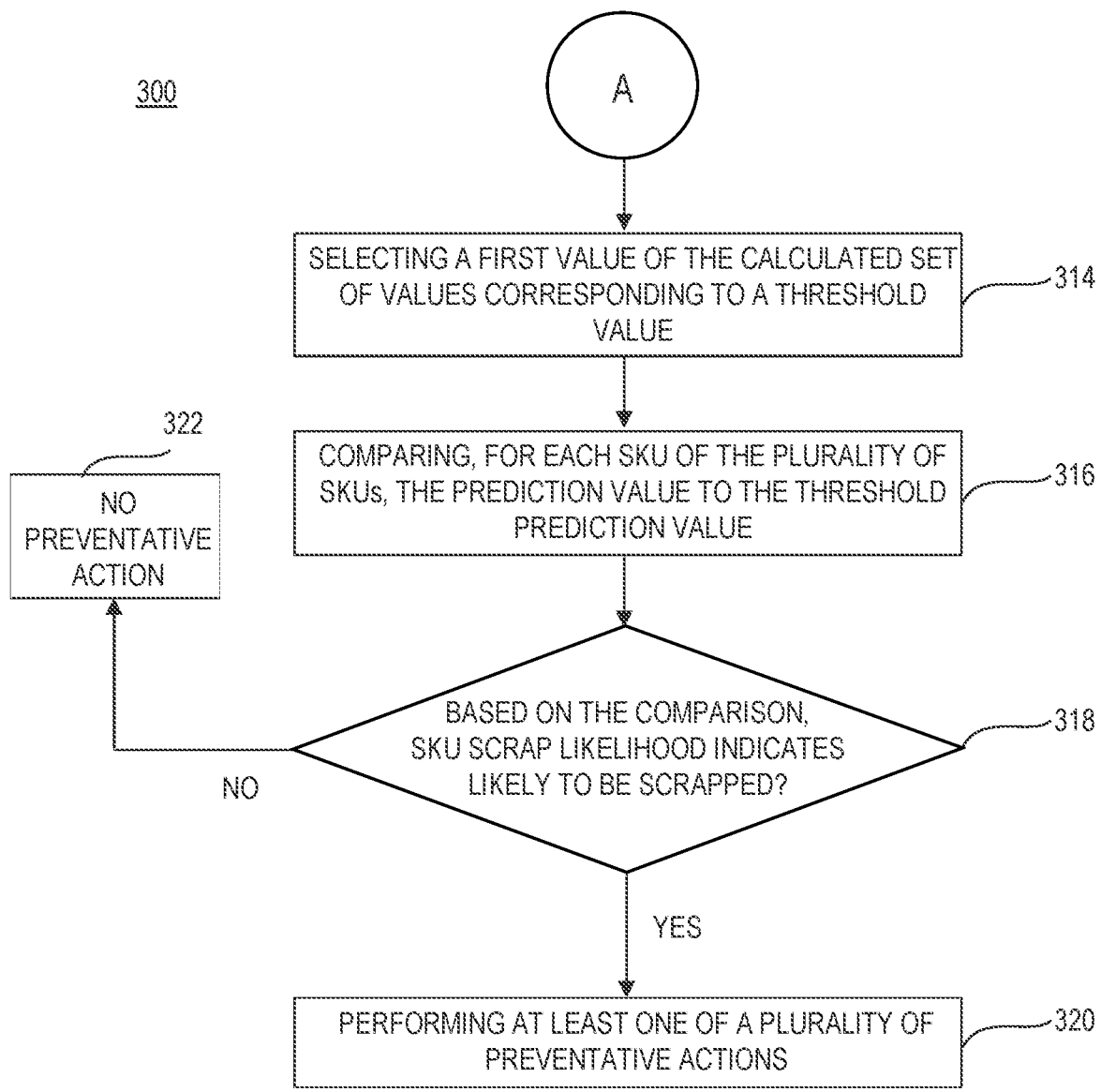

FIGS. 3A and 3B show an exemplary method 300 for predicting and managing scrap likelihood related to stock keeping units (SKUs) by using a trained prediction model. The method or a portion thereof may be performed by SCM system 117. For example, the system may include one or more processors and a memory storing instructions that, when executed by the one or more processors, cause the system to perform the steps shown in FIGS. 3A and 3B.

In step 302, one or more processors may be configured to receive a request to initiate a process related to predicting scrap likelihood associated with a plurality of SKUs (i.e., items). For example, SCM 117 may receive indication from a user through interaction on a graphical user interface (GUI) of a user device to begin a process for determining values related to predicting a scrap likelihood for a plurality of SKUs. In some embodiments, the request may originate from SCM 117 and be transmitted to a remote computer system to receive information related to predicted scrap for a plurality of SKUs. Additionally or alternatively, the request or indication may include selection of an element (e.g., button, box, icon) on a graphical user interface of a computer system, such as SCM 117, or communicating a request from a first computer system (e.g., a user device) to a second computer system (e.g., SCM 117).

In step 304, the one or more processors may be configured to prepare input data associated with each SKU of the plurality of SKUs. Step 304 is further described below with respect to box 304A in FIG. 3C. In step 324 of FIG. 3C, the one or more processors may be configured to, in response to receiving the request, retrieve data from a database, wherein the data comprises a plurality of scalable factors associated with each SKU of the plurality of SKUs. For example, source data comprising information related to SKUs may originally be stored in a data warehouse. In response to the request, the one or more processors may unload the source data to a storage and read the data into an application programming interface for extraction of necessary factors.

In step 326, the one or more processors may be configured to scale the plurality of factors associated with each SKU of the plurality of SKUs. For example, prior to inputting data into a neural network, the one or more processors may scale or normalize the input factors to transform the factors to be on a similar scale. Each factor may be associated with a different scale (e.g., number of days, hours, sales, occurrences), which can increase the difficulty of the problem being modeled. Thus, the input factors may be processed prior to being input into the neural network in order to scale or normalize the input factors to a common scale, such as a range of 0-1.

Figure 3C:
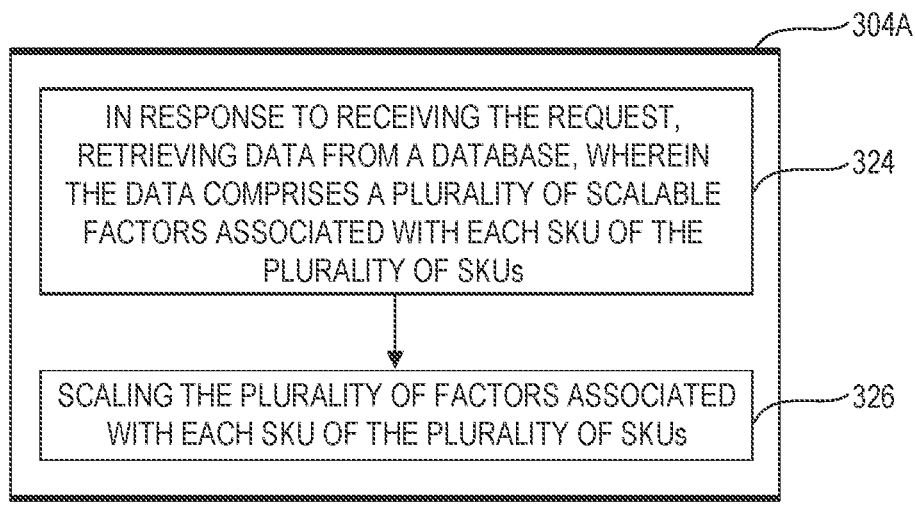
FIG. 3C shows an exemplary method for preparing input data for a prediction model, consistent with the disclosed embodiments.

After step 326 in FIG. 3C, the process moves to step 306 in FIG. 3A. In step 306, the one or more processors may be configured to input data associated with each SKU of the plurality of SKUs into a trained prediction model. For example, the one or more processors may input the plurality of scaled factors associated with each SKU of the plurality of SKUs into an open source library for machine learning. In some embodiments, the trained prediction model may be a deep neural network. In some embodiments, the trained prediction model may be a convolutional neural network. The trained neural network may be comprised of a first multi-dimensional input layer, nested layers, and a one-dimensional output layer that outputs a single value.

In step 308, the one or more processors may be configured to output, from the trained prediction model, a prediction value for each SKU of the plurality of SKUs. For example, after inputting the scaled factors into the open source library, the neural network may output a prediction value for each SKU of the plurality of SKUs. The prediction value may be a float number from 0 to 1, wherein a value of 1 may indicate scrap and a value of 0 may indicate non-scrap.

In step 310, the one or more processors may be configured to measure the trained prediction model by calculating a set of values. In some embodiments, the set of values may include recall values, precision values, F1 scores, F2 scores and gross merchandise value (GMV) loss percentages corresponding to scrap reduced percentages. For example, the one or more processors may perform back testing by using a confusion matrix to calculate recall and precision values based on historical scrap data. Back testing can be performed to see how well the neural network would have performed using historical data stored in a database of SCM 117, and a confusion matrix (i.e., error matrix) can be used to visualize the performance of the neural network based on back testing.

By performing back testing, the one or more processors may create a confusion matrix by calculating a number of true positive (i.e., SKU correctly predicted as scrap), true negative (i.e., SKU correctly predicted as non-scrap), false positive (i.e., SKU incorrectly predicted as scrap), and false negative (i.e., SKU incorrectly predicted as non-scrap) results. For example, the one or more processors may perform back testing for 1000 SKUs. By comparing the results of back testing to historical data indicating actually scrapped SKU items, the one or more processors may determine that of the 1000 SKUs, 450 were correctly predicted as scrap, 350 were correctly predicted as non-scrap, 150 were incorrectly predicted as scrap, and 50 were incorrectly predicted as non-scrap. With these results, the one or more processors may calculate values for recall and precision. For example, recall, which is a percentage of correct predictions among real scrap cases, can be calculated by dividing a number of true positive results by a number of real scrap cases (i.e., true positive plus false negative). In this case, recall would be 450/(450+50)=0.9. Precision, which is a percentage of correct predictions among the scrap predictions, can be calculated by dividing a number of true positive results by a number of positive cases (i.e., true positive plus false positive). In this case, precision would be 450/(450+150)=0.75. Based on the calculated recall and precision values, the one or more processors may calculate an F1 score and an F2 score. The F1 score indicates a balance of recall and precision and has a higher value when recall and precision are both at a higher level. The F2 score is similar to the F1 score, but weighted more heavily on recall than precision.

The one or more processors may be configured to match each SKU to the 4 fundamental cases in the confusion matrix to calculate a new GMV loss for each SKU of the plurality of SKUs. By calculating a new GMV loss value and calculating the difference between the new GMV loss value to the original GMV loss value caused by scrap, the one or more processors may calculate a loss function that represents the business effect of applying the prediction result.

In step 312, the one or more processors may be configured to generate a matrix comprising the calculated set of values. One such matrix is depicted in FIG. 6, described below.

After step 312, process 300 moves to step 314, in FIG. 3B. In step 314, the one or more processors may be configured to select a first value of the calculated set of values corresponding to a threshold prediction value of a plurality of threshold values. In some embodiments, the one or more processors may be configured to select the scrap reduced percentage, which determines an optimal threshold, based on a selection process. The selection process may include a set of rules based on possible preventative actions that can be performed to increase scrap reduced percentage. For example, if a preventative action applies to a SKU, the scrap reduced percentage for that SKU may increase or stay the same. On the other hand, if a preventative action does not apply to a SKU, the scrap reduced percentage for that SKU may decrease or stay the same. Based on the set of rules, the one or more processors may determine and select the scrap reduced percentage and may further determine the lowest GMV loss percentage associated with the scrap reduced percentage. For example, the one or more processors may select scrap reduced percentage 50% and determine that the lowest GMV loss percentage is −31.7% at a threshold of 0.5. In another example, the one or more processors may select scrap reduced percentage 40% and determine that the lowest GMV loss percentage is −38.6% at threshold values of 0.3, 0.4 and 0.5. In order to determine the most optimal threshold, the one or more processors may determine which recall and precision values are the most balanced. For example, based on matrix 600, at a threshold value of 0.3, recall is 0.62 and precision is 0.70. At a threshold value of 0.4, recall is 0.60 and precision is 0.71. At a threshold value of 0.5, recall is 0.59 and precision is 0.73. Based on these values, the one or more processors may determine that recall and precision are most balanced at a threshold of 0.4.

In some embodiments, the scrap reduced percentage is selected by a user using a user device to communicate with a computer system (e.g., SCM 117) via a graphical user interface (GUI). For example, the one or more processors may receive indication, from a user through interaction on a graphical user interface, of selecting a desired average scrap quantity reduced percentage based on a set of rules. Based on the selected percentage, the one or more processors may determine a lowest GMV loss percentage among the plurality of GMV loss percentages, and further determine a threshold value corresponding to the GMV loss percentage. Based on the determination of the threshold value, the one or more processors may set the threshold prediction value and determine, based on the values output by the prediction model, which SKU items are likely to be scrapped.

In step 316, the one or more processors may be configured to compare, for each SKU of the plurality of SKUs, the prediction value output from the trained prediction model to the threshold prediction value. For example, based on the comparison, the one or more processors may determine that the prediction value is greater than or less than the threshold prediction value In step 318, the one or more processors may be configured to determine, based on the comparison, a scrap likelihood for each SKU of the plurality of SKUs. For example, based on the determination that the prediction value associated with a SKU is greater than the threshold prediction value, the SKU items would be predicted as likely to be scrapped. On the other hand, based on the determination that the prediction value associated with a SKU is less than the threshold prediction value, the SKU items would be predicted as unlikely to be scrapped.

In step 320, the one or more processors may be configured to, based on the scrap likelihood indicating likely to be scrapped, perform at least one of a plurality of preventative actions. For example, the one or more processors may update a website to reduce a price associated with the SKU, update an order quantity for the SKU in a management database, or remove the SKU from a list of SKUs flagged as out of stock on the website. In another example, the one or more processors may update a website home page to display items associated with the SKU or generate instructions for transmission from a first computer system to a second computer system related to recommended actions. In some embodiments, the one or more processors may display a message on a device of SCM 117 or transmit a notification to user using a user device of SCM 117 to alert the user to order less SKU items, or to suggest a sale for the SKU items. In some embodiments, the one or more processors may be configured to perform the at least one of a plurality of preventative actions automatically in response to the scrap likelihood indicating likely to be scrapped. In some embodiments, the one or more processors may wait until determining a scrap likelihood for each SKU of all of the SKUs before performing a preventative action. Alternatively, the one or more processors may perform the preventative action as soon as a SKU is determined to be predicted scrap.

In step 322, the one or more processors may be configured to, based on the scrap likelihood indicating unlikely to be scrapped, perform no preventative actions. For example, after determining that the SKU is unlikely to be scrapped, the process may return to step 318 to determine a scrap likelihood for a next SKU of the plurality of SKUs.

Figure 4:
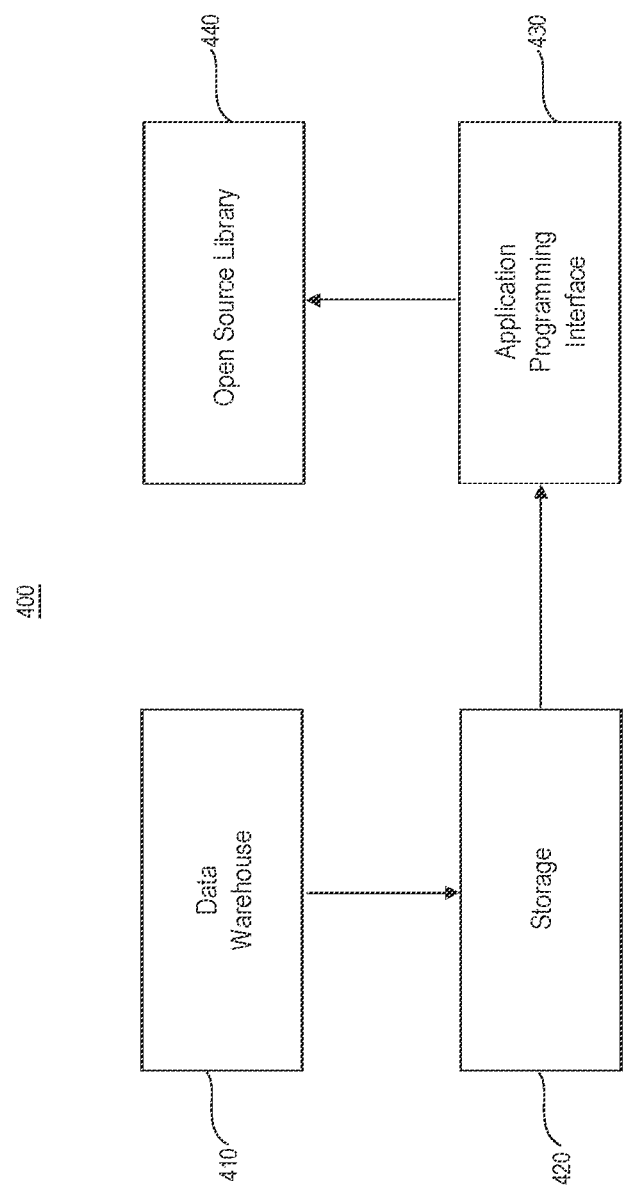
FIG. 4 shows a block diagram illustrating an exemplary flow of preparing input data for a prediction model, consistent with the disclosed embodiments.

FIG. 4 shows an exemplary block diagram 400 illustrating the flow of preparing input data for a trained neural network. Source data comprising information related to SKUs is stored in a data warehouse 410, such as Amazon Redshift. The information related to SKUs may include, but is not limited to, factors such as shelf-life, average sales, sales trend, inventory, out of stock (OOS) hours, code life sellable days, backlog, recent sales, recent scrap, recent order quantity, minimal order quantity (MOO), and the like. The one or more processors may access the source data from data warehouse 410 by using structural query language (SQL) to unload the data to a storage 420, such as storage service Amazon S3, and may read the data into an application programming interface 430, such as PySpark (i.e., interface for Apache Spark in Python). Application programming interface 430 may extract necessary factors from the data by using an open source tool, such as ELI5 (i.e. Python library), to analyze factor importance. Once the factors associated with each SKU of the plurality of SKUs are prepared, the one or more processors may input the prepared data into an open source library 440, such as Tensorflow, for machine learning.

Figure 5:
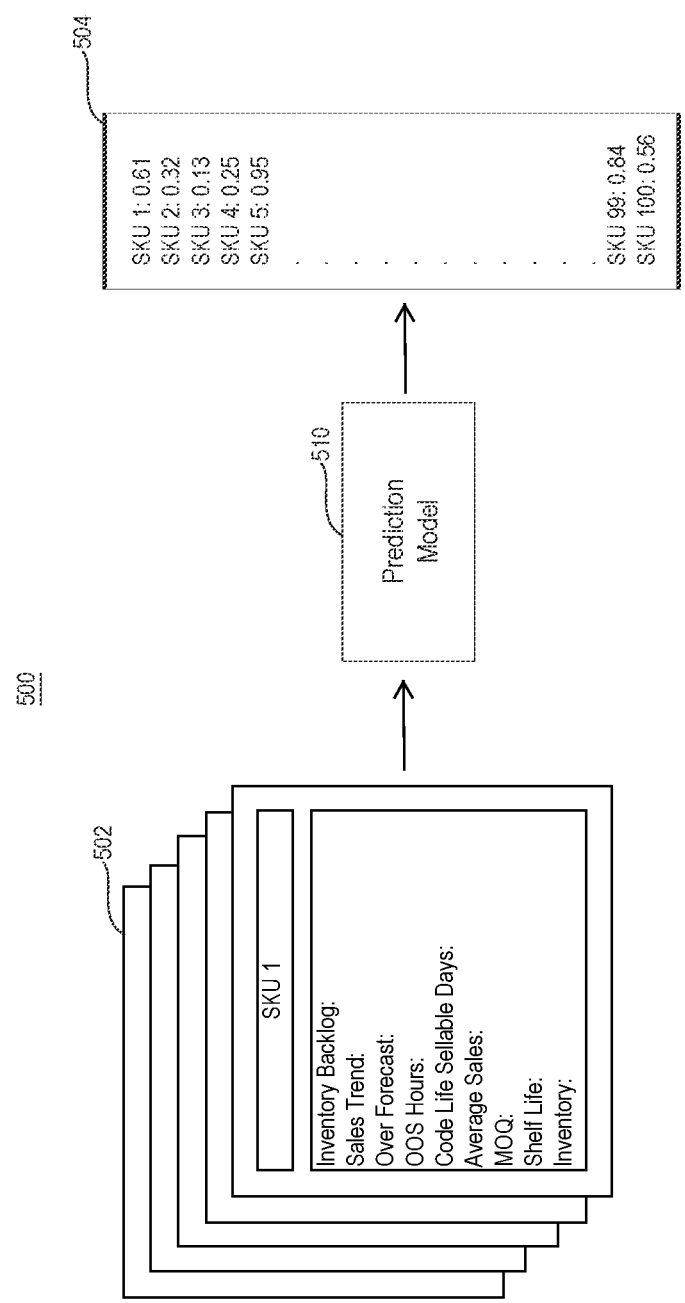
FIG. 5 shows a diagram illustrating an exemplary flow of information through a prediction model, consistent with the disclosed embodiments.

FIG. 5, described below, shows an exemplary diagram 500 illustrating the flow of information through prediction model 510. For example, one or more processors may input data 502 related to 100 SKUs comprising several factors including inventory backlog, sales trend, over forecast, OOS hours, code life sellable days, average sales, MOQ, shelf life, and inventory into prediction model 510. After data 502 is input into prediction model 510, prediction model 510 may output data 504 comprising a prediction value for each SKU of the 100 SKUs. The prediction values of data 504 output by prediction model 510 may be float numbers from 0 to 1, wherein a value of 1 would represent scrap and a value of 0 would represent non-scrap.

FIG. 6 illustrates an exemplary generated matrix 600 comprising the calculated set of values. Matrix 600 comprises variables threshold and average scrap quantity reduced percentage. Each average percentage of reducing scrap quantity has a range of GMV loss percentages corresponding to different threshold values. For example, at a scrap reduced percentage of 50%, there is a range of GMV loss percentages, including a greatest GMV loss percentage of 9.61% and a lowest GMV loss percentage of −31.7%. Matrix 600 also includes values for recall and precision at different threshold values, wherein the threshold value is a threshold prediction value related to the prediction values output by prediction model 510.

The GMV loss percentage corresponds to a threshold value, which can be used to set a threshold for determining what prediction values output by prediction model 510 can be predicted as scrap. When the threshold is set to a bigger number (i.e., greater than 0.5), there will be less cases to be predicted as scrap, and when the threshold is set to a smaller number (i.e., less than 0.5), there will be more cases to be predicted as scrap. In some embodiments, matrix 600 may also include values for F1 scores and F2 scores. Additionally or alternatively, matrix 600 may be displayed for viewing by a user on a user device.

In some embodiments, the scrap reduced percentage is selected by a user using a user device to communicate with a computer system (e.g., SCM 117) via a graphical user interface (GUI). For example, the one or more processors may receive indication, from a user through interaction on a graphical user interface, of selecting a desired average scrap quantity reduced percentage of 50% based on calculated values (e.g., recall, precision) shown in matrix 600. Based on the selected percentage of 50%, the one or more processors may determine a lowest GMV loss percentage of −31.7% among the plurality of GMV loss percentages, and further determine a threshold value 0.5 corresponding to the GMV loss percentage. Based on the determination of the threshold value, SCM 117 may set the threshold prediction value at 0.5 and determine, based on the values output by prediction model 510, which SKU items are likely to be scrapped. For example, by comparing the prediction value of 0.61 for SKU 1 as shown in data 504 (FIG. 5) to the threshold value set at 0.5, the one or more processors may determine that the prediction value is greater than the threshold prediction value. On the other hand, by comparing the prediction value of 0.32 for SKU 2 to the threshold value set at 0.5, the one or more processors may determine that the prediction value is less than the threshold prediction value. Based on the determination that the prediction value associated with SKU 1 is greater than the threshold prediction value, items with SKU 1 would be predicted as likely to be scrapped. On the other hand, based on the determination that the prediction value associated with SKU 2 is less than the threshold prediction value, items associated with SKU 2 would be predicted as unlikely to be scrapped. Based on the scrap likelihood indicating likely to be scrapped, the one or more processors may perform a preventative action, as discussed above. On the other hand, based on the scrap likelihood indicating unlikely to be scrapped, the one or more processors may not perform preventative actions. For example, after determining that items with SKU 2 are unlikely to be scrapped, the process may return to step 318 to determine a scrap likelihood for SKU 3.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for predicting and managing predicted scrap items, comprising:
   one or more memory devices storing instructions;
   one or more processors configured to execute the instructions to perform operations comprising:
      receiving a request to initiate a process related to predicting scrap likelihood associated with a plurality of stock keeping units (SKUs);
      in response to receiving the request, reading source data comprising a plurality of scalable factors associated with a plurality of scales into an application programming interface (API) using structured query language (SQL), wherein the plurality of scalable factors include at least shelf-life, average sales, sales trend, inventory, out of stock hours, code life sellable days, backlog, expiration date, temperature, recent sales, recent scrap, recent order quantity, or minimal order quantity associated with each SKU of the plurality of SKUs;
      determining an importance of each factor of the plurality of scalable factors based on an impact of each factor on first data, wherein the first data comprises data previously output by a trained prediction model;
      determining, for each factor of the plurality of scalable factors, whether an importance of the factor is greater than an importance threshold;
      using the API to extract a plurality of factors associated with each SKU of the plurality of SKUs from the source data based on the importance of each factor of the plurality of scalable factors, wherein each extracted factor is associated with an importance greater than the importance threshold;
      preparing input data associated with each SKU of the plurality of SKUs by scaling the extracted plurality of factors to a common scale and adjusting each scaled factor based on an importance associated with the scaled factor;
      preparing information related to the request by:
         inputting the input data associated with each SKU of the plurality of SKUs into the trained prediction model, wherein the trained prediction model comprises a convolutional neural network comprising a first multi-dimensional input layer, nested layers, and a one-dimensional output layer;
         outputting, from the trained prediction model, a prediction value for each SKU of the plurality of SKUs;
         measuring the trained prediction model by calculating a set of values; and
         generating a matrix comprising at least a subset of the calculated set of values;
      selecting a first value of the calculated set of values corresponding to a threshold prediction value of a plurality of threshold values;
      comparing, for each SKU of the plurality of SKUs, the prediction value output from the trained prediction model to the threshold prediction value;
      determining, based on the comparison, a scrap likelihood for each SKU of the plurality of SKUs; and
      based on the scrap likelihood indicating likely to be scrapped, causing a second computer system to update a website displaying up-to-date SKU information associated with the plurality of SKUs to a plurality of users accessing the website, wherein causing the second computer system to update the website includes:
         transmitting, to a third computer system, a first request to update the website, wherein the first request is in a first protocol;
         converting, by the third computer system, the first request to a second protocol; and
         forwarding, by the third computer system, the converted first request to update the website, wherein the converted first request causes the second computer system to automatically update the website displaying up-to-date SKU information associated with the plurality of SKUs.

2. The computer-implemented system of claim 1, wherein preparing input data associated with each SKU of the plurality of SKUs further comprises,
   in response to receiving the request, retrieving the source data from a database.

3. The computer-implemented system of claim 2, wherein inputting the input data associated with each SKU of the plurality of SKUs into a trained prediction model comprises inputting the plurality of scaled factors associated with each SKU of the plurality of SKUs into the trained prediction model.

4. The computer-implemented system of claim 1, wherein the processor is further configured to execute the instructions to perform operations comprising performing at least one of a plurality of preventative actions based on the scrap likelihood indicating likely to be scrapped, wherein performing at least one of a plurality of preventative actions comprises updating the website to reduce a price associated with the SKU, updating an order quantity for the SKU in a management database, or removing the SKU from a list of SKUs flagged as out of stock on the website.

5. The computer-implemented system of claim 1, wherein the processor is further configured to execute the instructions to perform operations comprising, based on the scrap likelihood indicating unlikely to be scrapped, performing no preventative actions.

6. The computer-implemented system of claim 1, wherein the calculated set of values includes recall values, precision values, F1 scores, F2 scores and gross merchandise value (GMV) loss percentages.

7. The computer-implemented system of claim 1, wherein determining, based on the comparison, a scrap likelihood for each SKU of the plurality of SKUs comprises:
  determining that one or more items with a particular SKU are likely to be scrapped when the prediction value is greater than the threshold prediction value; and
  determining that one or more items with a particular SKU are unlikely to be scrapped when the prediction value is less than the threshold prediction value.

8. The computer-implemented system of claim 1, wherein the one or more processors is further configured to execute the instructions to perform operations comprising:
  determining a gross merchandise value (GMV) loss percentage of the plurality of GMV loss percentages and the corresponding threshold prediction value of the plurality of threshold values based on the selected first value,
  wherein the selected first value is a selected scrap quantity reduced percentage.

9. The computer-implemented system of claim 1, wherein measuring the trained prediction model by calculating a set of values includes using a confusion matrix.

10. A computer-implemented method for predicting and managing predicted scrap items, comprising:
  receiving a request to initiate a process related to predicting scrap likelihood associated with a plurality of stock keeping units (SKUs);
  in response to receiving the request, reading source data comprising a plurality of scalable factors associated with a plurality of scales into an application programming interface (API) using structured query language, wherein the plurality of scalable factors include at least shelf-life, average sales, sales trend, inventory, out of stock hours, code life sellable days, backlog, expiration date, temperature, recent sales, recent scrap, recent order quantity, or minimal order quantity associated with each SKU of the plurality of SKUs;
  determining an importance of each factor of the plurality of scalable factors based on an impact of each factor on first data, wherein the first data comprises data previously output by a trained prediction model;
  determining, for each factor of the plurality of scalable factors, whether an importance of the factor is greater than an importance threshold;
  using the API to extract a plurality of factors associated with each SKU of the plurality of SKUs from the source data based on the importance of each factor of the plurality of scalable factors, wherein each extracted factor is associated with an importance greater than an importance threshold;
  preparing input data associated with each SKU of the plurality of SKUs by scaling the extracted plurality of factors to a common scale and adjusting each scaled factor based on an importance associated with the scaled factor;
  preparing information related to the request by:
    inputting the input data associated with each SKU of the plurality of SKUs into the trained prediction model, wherein the trained prediction model comprises a convolutional neural network comprising a first multi-dimensional input layer, nested layers, and a one-dimensional output layer;
    outputting, from the trained prediction model, a prediction value for each SKU of the plurality of SKUs;
    measuring the trained prediction model by calculating a set of values; and
    generating a matrix comprising at least a subset of the calculated set of values;
  selecting a first value of the calculated set of values corresponding to a threshold prediction value of a plurality of threshold values;
  comparing, for each SKU of the plurality of SKUs, the prediction value output from the trained prediction model to the threshold prediction value;
  determining, based on the comparison, a scrap likelihood for each SKU of the plurality of SKUs; and
  based on the scrap likelihood indicating likely to be scrapped, causing a second computer system to update a website displaying up-to-date SKU information associated with the plurality of SKUs to a plurality of users accessing the website, wherein causing the second computer system to update the website includes:
    transmitting, to a third computer system, a first request to update the website, wherein the first request is in a first protocol;
    converting, by the third computer system, the first request to a second protocol; and
    forwarding, by the third computer system, the converted first request to update the website, wherein the converted first request causes the second computer system to automatically update the website displaying up-to-date SKU information associated with the plurality of SKUs.

11. The computer-implemented method of claim 10, wherein preparing input data associated with each SKU of the plurality of SKUs further comprises,
  in response to receiving the request, retrieving the source data from a database.

12. The computer-implemented method of claim 11, wherein inputting the input data associated with each SKU of the plurality of SKUs into a trained prediction model comprises inputting the plurality of scaled factors associated with each SKU of the plurality of SKUs into the trained prediction model.

13. The computer-implemented method of claim 10, further comprising performing at least one of a plurality of preventative actions based on the scrap likelihood indicating likely to be scrapped, wherein performing at least one of a plurality of preventative actions comprises updating website to reduce a price associated with the SKU, updating an order quantity for the SKU in a management database, or removing the SKU from a list of SKUs flagged as out of stock on the website.

14. The computer-implemented method of claim 10, the method further comprising, based on the scrap likelihood indicating unlikely to be scrapped, performing no preventative actions.

15. The computer-implemented method of claim 10, wherein the calculated set of values includes recall values, precision values, F1 scores, F2 scores and gross merchandise value (GMV) loss percentages.

16. The computer-implemented method of claim 10, wherein determining, based on the comparison, a scrap likelihood for each SKU of the plurality of SKUs comprises:
  determining that one or more items with a particular SKU are likely to be scrapped when the prediction value is greater than the threshold prediction value; and determining that one or more items with a particular SKU are unlikely to be scrapped when the prediction value is less than the threshold prediction value.

17. The computer-implemented method of claim 10, the method further comprising:
   determining a gross merchandise value (GMV) loss percentage of the plurality of GMV loss percentages and the corresponding threshold prediction value of the plurality of threshold values based on the selected first value,
   wherein the selected first value is a selected scrap quantity reduced percentage.

18. A computer-implemented system for predicting and managing predicted scrap items, comprising:
   one or more memory devices storing instructions;
   one or more processors configured to execute the instructions to perform operations comprising:
      receiving a request to initiate a process related to predicting scrap likelihood associated with a plurality of stock keeping units (SKUs);
      in response to receiving the request, reading source data comprising a plurality of scalable factors associated with a plurality of scales into an application programming interface (API) using structured query language, wherein the plurality of scalable factors include at least shelf-life, average sales, sales trend, inventory, out of stock hours, code life sellable days, backlog, expiration date, temperature, recent sales, recent scrap, recent order quantity, or minimal order quantity associated with each SKU of the plurality of SKUS;
      determining an importance of each factor of the plurality of scalable factors based on an impact of each factor on first data, wherein the first data comprises data previously output by a trained prediction model;
      determining, for each factor of the plurality of scalable factors, whether an importance of the factor is greater than an importance threshold;
      using the API to extract a plurality of factors associated with each SKU of the plurality of SKUs from the source data based on the importance of each factor of the plurality of scalable factors, wherein each extracted factor is associated with an importance greater than an importance threshold;
      preparing input data associated with each SKU of the plurality of SKUs by scaling the extracted plurality of factors to a common scale and adjusting each scaled factor based on an importance associated with the scaled factor;
      preparing information related to the request by:
         inputting the input data associated with each SKU of the plurality of SKUs into the trained neural network, wherein the trained neural network comprises a convolutional neural network comprising a first multi-dimensional input layer, nested layers, and a one-dimensional output layer;
         outputting, from the trained neural network, a prediction value for each SKU of the plurality of SKUS;
         measuring the trained neural network by calculating a set of values; and
         generating a matrix comprising at least a subset of the calculated set of values;
      selecting a first value of the calculated set of values corresponding to a threshold prediction value of a plurality of threshold values;
      comparing, for each SKU of the plurality of SKUs, the prediction value output from the trained neural network to the threshold prediction value;
      determining, based on the comparison, a scrap likelihood for each SKU of the plurality of SKUs; and
      based on the scrap likelihood indicating likely to be scrapped, causing a second computer system to update a website displaying up-to-date SKU information associated with the plurality of SKUS to a plurality of users accessing the website, wherein causing the second computer system to update the website includes:
         transmitting, to a third computer system, a first request to update the website, wherein the first request is in a first protocol;
         converting, by the third computer system, the first request to a second protocol; and
         forwarding, by the third computer system, the converted first request to update the website, wherein the converted first request causes the second computer system to automatically update the website displaying up-to-date SKU information associated with the plurality of SKUs.

* * * * *